J. B. RIVERA.
SLABS FOR WORKING CONFECTIONERY.

No. 174,575. Patented March 7, 1876.

WITNESSES
Henry N. Miller
Franck L. Durand

INVENTOR
Jas. Barrera Rivera
By Alexander Mason
Attorneys.

UNITED STATES PATENT OFFICE.

JAMES BARRERA RIVERA, OF BALTIMORE, MARYLAND.

IMPROVEMENT IN SLABS FOR WORKING CONFECTIONERY.

Specification forming part of Letters Patent No. 174,575, dated March 7, 1876; application filed February 5, 1876.

*To all whom it may concern:*

Be it known that I, JAS. BARRERA RIVERA, of Baltimore, in the county of Baltimore and in the State of Maryland, have invented certain new and useful Improvements in Slabs for Working Confectionery; and do hereby declare that the following is a full, clear, and exact description thereof, reference being had to the accompanying drawing, and to the letters of reference marked thereon, making a part of this specification.

My invention relates to slabs for working confectionery; and it consists in a slab made in two pieces, the bottom part provided with partitions, and forming a steam-chamber between the parts with an inlet-opening and two exits, as hereinafter described.

In order to enable others skilled in the art to which my invention appertains to make and use the same, I will now proceed to describe its construction and operation, referring to the annexed drawing, in which—

Figure 1:
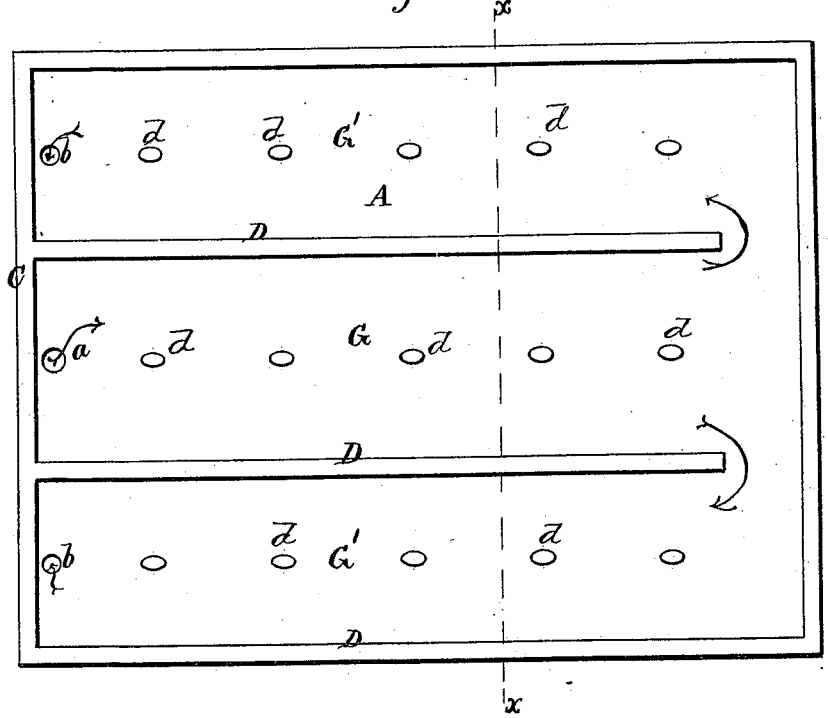
Figure 2:
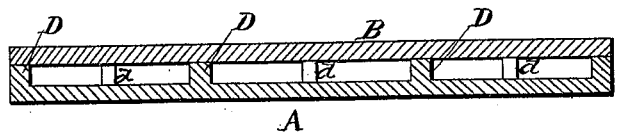

Figure 1 is a plan view of my slab, with the top removed. Fig. 2 is a cross-section through the line $x\ x$, Fig. 1.

In the usual way of working confectionery marble slabs are used, and as soon as one slab gets hot the next mass of sugar must be placed on another slab, and so on, necessitating the employment of a series of these slabs.

The object of my invention is to make one slab serve the purpose of several, as heretofore used. To this end I make the slab of two parts, A and B, the upper part B being formed with a smooth or polished surface, upon which the sugar is to be worked. The bottom part A of this slab is made about one-half inch thick, and the space between the top and bottom is from one-fourth to one inch high. The size of the slab is from three feet wide to three, four, or five feet long, and the bottom part A has flanges $c\ c$ around its edges on which the top B is supported, and to which it is secured by screws or any other suitable means. The bottom A is further provided with two longitudinal partitions, D D, extending from one end of the slab to within six inches of the other end, forming a center-passage, G, about twelve inches wide and two side passages, G', each about ten inches wide. The water enters at the head of the center-passage G through an orifice, $a$, about one inch in diameter, passes the entire length of said passage, divides into the side passages G' G', running the entire length thereof, and passes out through orifices $b\ b$, each about one-third inch in diameter, at the heads of the passages G'. The water passing in through the opening $a$ fills the entire space in the slab and passes out through the openings $b$ as soon as it gets heated, keeping the top of the slab always cool. In the same manner the top of the slab may be kept hot by admitting hot water or steam into it instead of cold water. This, of course, depends upon the character of the confectionery to be worked, whether the slab is to be kept cool or warm. The bottom part A of the slab may be made of cast or wrought iron, and the top B of marble or any other suitable material. In the passages G G' are a number of posts, $d$, forming supports for the top B of the slab.

Having thus fully described my invention, what I claim as new, and desire to secure by Letters Patent, is—

The slab A B, made in two pieces, the bottom part A provided with partitions D D, and forming a steam-chamber between the parts, and having the inlet-opening $a$ and exits $b\ b$, substantially as and for the purposes herein set forth.

In testimony that I claim the foregoing I have hereunto set my hand this 1st day of February, 1876.

JAS. BARRERA RIVERA.

Witnesses:
O. L. EVERT,
H. A. HALL.